United States Patent [19]

Schmidt

[11] Patent Number: 5,007,821
[45] Date of Patent: Apr. 16, 1991

[54] INJECTION MOLDING MANIFOLD HAVING A PAIR OF COOLING BORES ON OPPOSITE SIDES OF THE MELT PASSAGE

[75] Inventor: Harald H. Schmidt, Georgetown, Canada

[73] Assignee: Mold-Masters Limited, Georgetown, Canada

[21] Appl. No.: 489,044

[22] Filed: Mar. 5, 1990

[30] Foreign Application Priority Data

Feb. 23, 1990 [CA] Canada ................................ 2010961

[51] Int. Cl.⁵ ............................................ B29C 45/73
[52] U.S. Cl. ................................ 425/548; 264/328.14; 264/328.16; 425/572; 425/588
[58] Field of Search ............... 425/547, 548, 549, 552, 425/569, 572, 570, 588; 264/328.14, 328.16

[56] References Cited

U.S. PATENT DOCUMENTS

| | | | |
|---|---|---|---|
| 4,439,915 | 4/1984 | Gellert | 29/611 |
| 4,688,622 | 8/1987 | Gellert | 164/61 |
| 4,902,454 | 2/1990 | Steinbichler et al. | 425/548 |

FOREIGN PATENT DOCUMENTS

| | | | |
|---|---|---|---|
| 2023801 | 11/1971 | Fed. Rep. of Germany | 425/547 |
| 400553 | 4/1966 | Switzerland | 425/547 |

Primary Examiner—Timothy Heitbrink
Attorney, Agent, or Firm—Dalesman & Company

[57] ABSTRACT

An injection molding heated manifold having a melt passage with a longitudinal portion to convey melt from a molding machine to a number of different nozzles. The steel manifold has a pair of cooling bores extending parallel to and equally spaced on opposite sides of the longitudinal portion of the melt channel. A cooling fluid, such as air, flows through the cooling bores to quickly cool the manifold after the system is shut down to minimize deterioration of the melt in the melt channel. The air flows helically around spiral vanes which are mounted in the cooling bores to avoid temperature stratification along the melt passage.

3 Claims, 3 Drawing Sheets

INJECTION MOLDING MANIFOLD HAVING A PAIR OF COOLING BORES ON OPPOSITE SIDES OF THE MELT PASSAGE

BACKGROUND OF THE INVENTION

This invention relates generally to injection molding and more particularly to an improved melt conveying manifold having provision for cooling as well as heating.

As is well known in the art, multi-cavity hot runner injection molding systems have a heated manifold to convey the pressurized melt from the inlet from the molding machine to a number of outlets, each leading to a heated nozzle which extends to a gate to the respective cavity. These manifolds have various configurations depending upon the number and arrangement of the cavities. Different arrangements of electrical heaters are known for heating the manifolds to the necessary operating temperature. For instance, the manifold can have an electrical heating element integrally cast into it as described in Gellert U.S. Pat. No. 4,688,622 which issued Aug. 25, 1987. Cartridge heaters can be cast in the manifold as disclosed in Gellert U.S. Pat. No. 4,439,915 which issued Apr. 3, 1984 or plate heaters can be secured along the surface of the manifold as shown in the present case.

Depending upon the type of material being molded, these manifolds may be heated to temperatures over 600° F. Thus, because of the considerable mass of each manifold, it takes quite a while for them to cool down when the system is shut down. This often results in deterioration of the melt which remains in the melt passage in the manifold. This is due to the fact that many plastic melts are temperature sensitive over a period of time and will decompose and result in discolouration or carbonization. When the system is restarted, the deteriorated material is ejected into the cavities resulting in scrap products, or if the deterioration is more extreme, the system must be dissassembled and the melt passages cleaned out. At present, this problem can be avoided by flushing out the system with a very heat stable material on shut down, but this causes other problems when restarting.

SUMMARY OF THE INVENTION

Accordingly, it is an object of the present invention to at least partially overcome the disadvantages of the prior art by providing the manifold with cooling which can be activated when the system is shut down.

To this end, in one of its aspects, the invention provides an elongated injection molding steel heated manifold having ends and a melt passage with a longitudinal portion extending therethrough to convey melt received at an inlet from a molding machine to a plurality of outlets, each outlet leading to a heated nozzle, the improvement comprising a pair of cooling bores to convey cooling fluid therethrough extending longitudinally through the manifold from one of said ends of the manifold to the other of said ends of the manifold, the pair of cooling bores extending parallel to the longitudinal portion of the melt passage and being equally spaced on opposite sides of the longitudinal portion of the melt passage, each cooling bore extending from an inlet at one end of the manifold to an outlet at the other end, each cooling bore having a spiral vane mounted directly therein to provide one way turbulent flow of the cooling fluid therethrough.

Further objects and advantages of the invention will appear from the following description taken together with the accompanying drawings

DETAILED DESCRIPTION OF THE DRAWINGS

Figure 1:
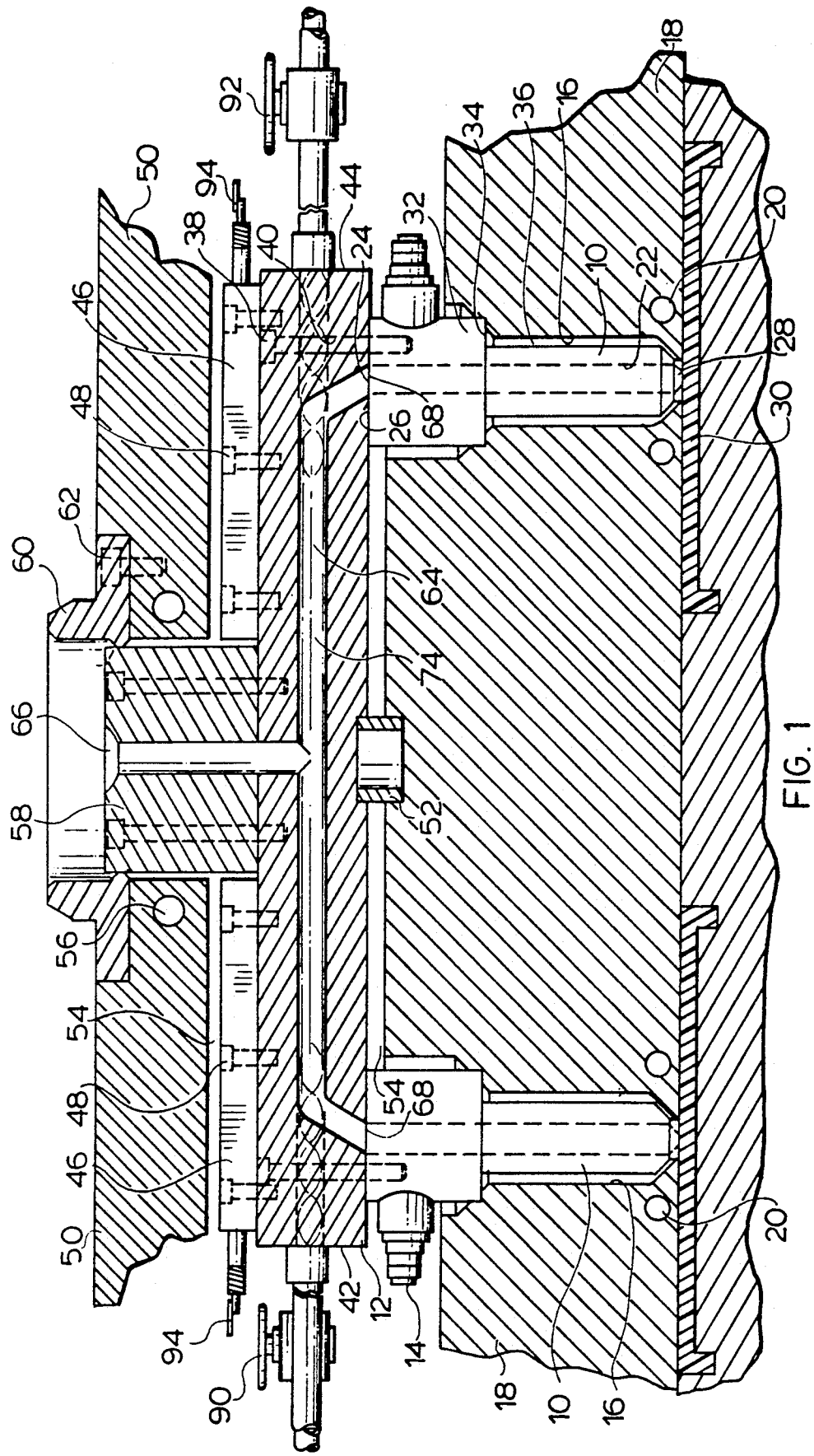
FIG. 1 is a sectional view of a multi-cavity injection molding system having a manifold according to one embodiment of the invention.
Figure 2:
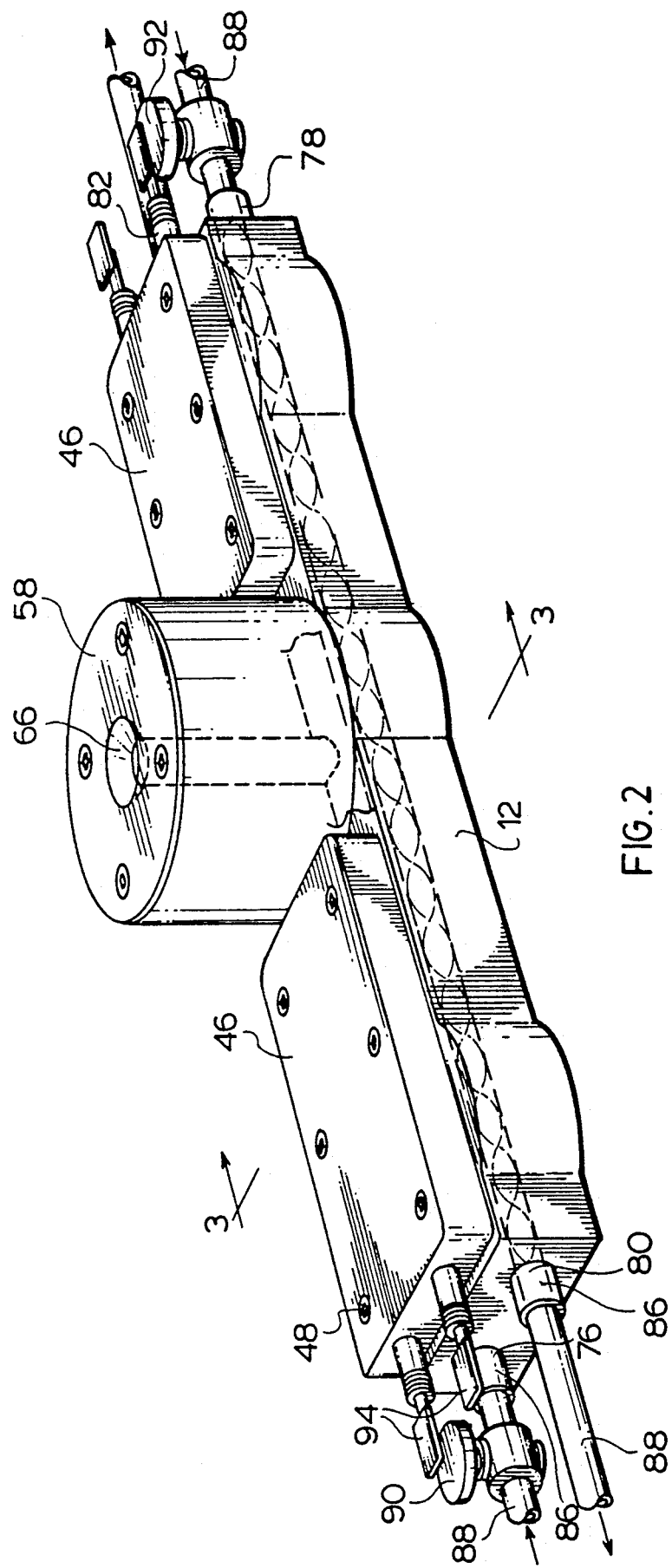
FIG. 2 is an isometric view of the manifold seen in FIG. 1.

Reference is first made to FIG. 1 which shows a multi-cavity injection molding system or apparatus having a number of heated nozzles 10 extending from a common elongated heated manifold 12 according to one embodiment of the invention. Each nozzle 10 is seated in a well 16 in a cavity plate 18 and has an integral helical heating element (not shown) extending from a terminal 14. The cavity plate 18 is cooled by pumping cooling water through cooling conduits 20 which extend through the cavity plate 18. Each nozzle 10 has a central melt bore 22 which extends from an inlet 24 at the rear end 26 to a gate 28 leading to a cavity 30. The nozzle 10 is located in this position by a circumferential insulating flange or bushing 32 which sits on a circumferential shoulder 34. As can be seen, this provides an insulative air space 36 between the heated nozzle 10 and the surrounding cooled cavity plate 18.

The nozzles 10 are secured tightly to the common manifold 12 by bolts 38 which extend through bolt holes 40 (with clearance for heat expansion) in the manifold 12. In this embodiment, the manifold 12 is elongated with two ends 42,44. However, in other embodiments, the manifold can have a variety of configurations depending upon the number of nozzles 10 and their arrangement. In this embodiment the manifold 12 is heated by electrical plate heaters 46 which are secured to it by bolts 48. Other types of heaters, such as integrally cast in electrical heaters can be used in other embodiments. The elongated steel manifold 12 with the plate heaters 46 secured to it extends between the cavity plate 18 and a back plate 50. They are located in this position by a locating ring 52 which is seated between the manifold 12 and the cavity plate 18. An insulative air space 54 is provided around the manifold 12 between it and the cavity plate 18 and the back plate 50 which is also cooled by pumping cooling water through cooling conduits 56. The manifold 12 has a manifold extension 58 which extends rearwardly through the back plate 50. The manifold extension 58 is securely located by a locating collar 60 which is secured to the back plate 50 by bolts 62.

Figure 3:
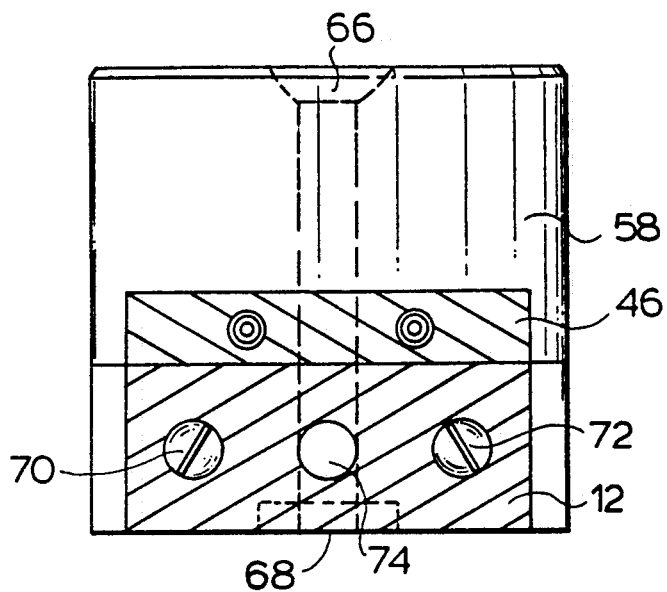
FIG. 3 is a sectional view taken along line 3—3 in FIG. 2.
Figure 4:
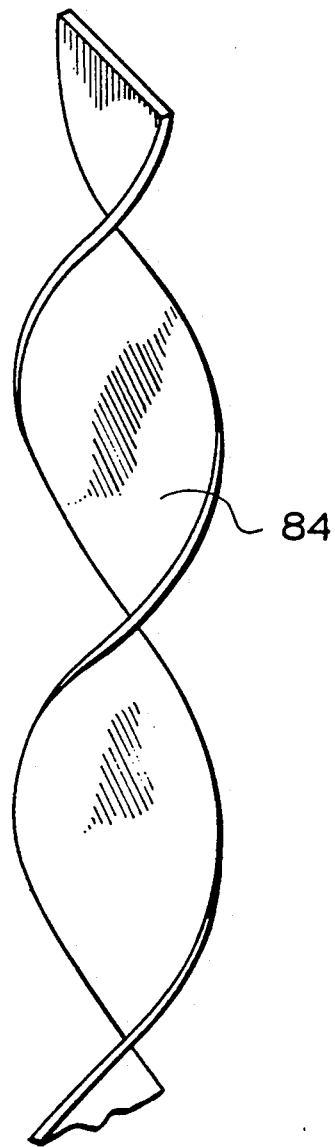
FIG. 4 is an isometric view of the spiral vane which is received in each cooling bore to provide helical flow of the cooling fluid.

The manifold 12 has a melt passage 64 which extends from an inlet 66 in the manifold extension 58 and branches to a number of outlets 68, each of which is aligned with the inlet 24 to the melt bore 22 of one of the nozzles 10. The manifold 12 also has a pair of longitudinal cooling bores 70,72 which extend from one end 42 of the manifold to the other end 44. The cooling bores 70,72 extend parallel to a longitudinal portion 74 of the melt passage 64 and, as clearly seen in FIG. 3, are equally spaced on opposite sides of the longitudinal portion 74 of the melt passage 64. Each of the cooling bores 70,72 has an inlet 76,78 at one end of the manifold 12 and an outlet 80,82 at the other end of the manifold 12. In this embodiment, the inlets 76,78 and outlets 80,82 of the cooling bores 70,72 are reversed so that flow through the cooling bores 70,72 is in opposite directions to balance the cooling effect. Each cooling bore 70,72 has a spiral vane 84, as clearly shown in FIG. 4, extending in it to provide turbulent flow of the cooling fluid. Threaded connectors 86 are mounted at each of the inlets 76,78 and outlets 80,82 to receive connector tubes 88 which extend to circulate cooling fluid from a conventional source (not shown). Shut-off valves 90,92 are mounted in each line to prevent circulation of the cooling fluid when the injection molding system is operating.

In use, the system is assembled as shown in FIG. 1 and electrical power is applied to terminals 14 of the electrical heating elements in the nozzles 10 and the terminals 94 of the plate heaters 46 to heat the nozzles 10 and the manifold 12 to a predetermined operating temperature. Pressurized melt is applied from a molding machine (not shown) to the inlet 66 of the melt passage 64 according to a predetermined cycle. The melt flows through the nozzle 10 and gate 28 into the cavities 30. After the cavities are filled and a suitable packing and cooling period has expired, the injection pressure is released. The mold is then opened to eject the molded products. After ejection, the mold is closed and the cycle is repeated continuously with a cycle time dependent upon the size of the cavities and the type of material being molded.

When it is necessary to shut down the system, injection pressure is not reapplied following ejection and electrical power to the terminals 14,94 of the heaters is shut off. The valves 90,92 in the tubes 88 are then immediately opened and air flows through the cooling bores 70 72 of the manifold 12. This quickly lowers the temperature of the manifold 12 to minimize deterioration of the melt in the melt passage 64. The air flows turbulently around the spiral vanes 84 in the cooling bores 70,72 to avoid temperature stratification along the melt passage 64. After the manifold is cooled sufficiently, the valves 90,92 are closed to shut off the air circulation before the system is restarted.

While the description of the cooled injection molding manifold have been given with respect to one embodiment of the invention, it is not to be construed in a limiting sense. Variations and modifications will occur to those skilled in the art. For instance, it will be apparent that the manifold 12 can have various configurations for different applications. The cooling fluid can be water or some other suitable liquid or gas rather than air. Control of cooling fluid circulation can be provided by a pump rather than the valves 90,92. Reference is made to the appended claims for a definition of the invention.

What I claim is:

1. In an elongated injection molding steel heated manifold having a first end, an opposite second end and a melt passage with a longitudinal portion extending therethrough to convey melt received at an inlet from a molding machine to a plurality of outlets, each outlet leading to a heated nozzle, the improvement comprising;
   a pair of cooling bores to convey cooling fluid therethrough extending longitudinally through the manifold from said first end of the manifold to said second end of the manifold, the pair of cooling bores extending parallel to the longitudinal portion of the melt passage and being equally spaced on opposite sides of the longitudinal portion of the melt passage, each cooling bore extending from an inlet at the first end of the manifold to an outlet at the second end, each cooling bore having a spiral vane mounted directly therein to provide one way turbulent flow of the cooling fluid therethrough.

2. An injection molding manifold as claimed in claim 1 wherein connectors are located at the inlet and outlet of each cooling bore to receive cooling fluid connector tubes.

3. An injection molding manifold as claimed in claim 2 wherein valve means are mounted in the cooling fluid connector tubes to shut off the flow of cooling fluid through the cooling bores.

* * * * *